US008156553B1

(12) United States Patent
Church et al.

(10) Patent No.: US 8,156,553 B1
(45) Date of Patent: Apr. 10, 2012

(54) SYSTEMS AND METHODS FOR CORRELATING LOG MESSAGES INTO ACTIONABLE SECURITY INCIDENTS AND MANAGING HUMAN RESPONSES

(75) Inventors: Christopher Church, Houston, TX (US); Eugene Golovinsky, Houston, TX (US); Mikhail Govshteyn, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 692 days.

(21) Appl. No.: 12/171,713

(22) Filed: Jul. 11, 2008

(51) Int. Cl.
*G06F 11/00* (2006.01)
(52) U.S. Cl. .......................................... 726/22; 709/224
(58) Field of Classification Search ............... 726/22–25, 726/11; 709/224
See application file for complete search history.

(56) References Cited

U.S. PATENT DOCUMENTS

| 7,356,843 B1* | 4/2008 | Kingsford ........................ 726/22 |
| 7,599,939 B2 | 10/2009 | DeStefano et al. |
| 7,689,610 B2* | 3/2010 | Bansal et al. .......... 707/999.006 |
| 2003/0188189 A1* | 10/2003 | Desai et al. .................... 713/201 |
| 2004/0030931 A1* | 2/2004 | Chamandy et al. ............ 713/201 |
| 2004/0039804 A1* | 2/2004 | Carr et al. ...................... 709/223 |
| 2005/0114508 A1* | 5/2005 | DeStefano ..................... 709/224 |
| 2005/0234909 A1* | 10/2005 | Bade et al. ......................... 707/8 |
| 2007/0283194 A1 | 12/2007 | Villella et al. |
| 2008/0040191 A1* | 2/2008 | Chakravarty et al. ............. 705/9 |
| 2009/0319576 A1* | 12/2009 | Srour et al. .................... 707/200 |

OTHER PUBLICATIONS

Christopher S. Henning, "Parsing and Analyzing Log Files A major Qualifying Project Report Submitted to the Faculty of the Worcester Polytechnic Institute", May 10, 2007, Professor Craig E. Wills, Major Advisor, Retrieve Date Aug. 20, 2011.*

* cited by examiner

*Primary Examiner* — Samson Lemma
(74) *Attorney, Agent, or Firm* — Sprinkle IP Law Group (57) ABSTRACT

Systems and methods for correlating log messages into actionable incidents. Some embodiments implement a method which includes comparing a plurality of disparate log messages to a plurality of incident descriptions. The disparate log messages can be parsed. When the messages correlate with an incident description an incident case can be created. Workflow steps can be associated with the incident case and output along with the incident case. Additional disparate log messages can be compared to the incident expressions and, when additional messages correlate with the correlated incident description, the incident case can be adjusted. In some embodiments, the adjustment can include adding workflow steps to the incident case. Results of various workflow steps can be monitored and adjustments can be made accordingly. In some embodiments, the results can include out-of-bounds activities.

17 Claims, 10 Drawing Sheets

SYSTEMS AND METHODS FOR CORRELATING LOG MESSAGES INTO ACTIONABLE SECURITY INCIDENTS AND MANAGING HUMAN RESPONSES

TECHNICAL FIELD OF THE DESCRIPTION

Embodiments of the disclosure relate generally to network security and regulatory compliance and more particularly to systems and methods for managing computer related incidents.

BACKGROUND

Computer systems utilized for business and other systems generate messages which report user access, service errors, and other information about the operation of the systems. These messages are recorded in a log, managed by the computing system and are therefore called log messages. Traditionally log messages are recorded in files on the local file system, or in the case of Syslog enabled systems, can be directed to external storage systems. In some scenarios, computing systems based on Microsoft Windows record log messages to the local file system via the Windows Event Log.

Recent industry and government regulations such as the Payment Card Industry Data Security Standard (PCI DSS), Sarbanes-Oxley Act (SOX), Health Insurance Portability and Accountability Act (HIPAA), and the Gramm-Leach-Bliley Act (GLBA), etc. require that log data be collected, regularly reviewed, and securely archived. To meet the requirements of these regulations, log message files must be archived for up to seven (7) years. For large organizations or organizations with specialized operations, the volume of log messages generated may require storage capacity approaching petabytes (PB) of data. This has generally resulted in significant capital investment, staffing expense and operational complexity necessary to provide secure and reliable storage for the required length of time.

Complications also arise when attempts are made to review the volumes of log messages generated. Hardware and software vendors, developers, owners, etc. encode information in their log messages in varying ways. Thus, from the perspective of systems that receive these varying log messages, the messages are freeform with little, if any, formatting in common. Complicating the situation further, several types of log messages (even from the same vendor) can convey the same or similar information while varying widely in format. Because of the freeform nature of log messages, obtaining meaningful information from the data encoded in the multitude of log messages from even one computer system can require manual review of hundreds, thousands, or more disparate log messages. Manually reviewing such massive quantities of information entails correspondingly massive quantities of labor, time, and effort. Manually correlating data, manually detecting meaningful patterns, manually recognizing incidents, and the like with such massive numbers of log messages require skills, talents, and endurance not readily available to most business organizations.

SUMMARY OF THE DESCRIPTION

Embodiments of the present disclosure provide systems and methods for managing network incidents that eliminate, or at least substantially reduce, the shortcomings of prior art managing computer related incidents.

Embodiments provide methods and systems for managing information related incidents. One embodiment implements a method in which a number of disparate log messages are compared to incident descriptions. The disparate log messages can be pre-parsed such that information encoded in the messages can be compared to the incident descriptions. When some messages correlate with an incident description, or more than one incident descriptions, an incident case can be created which corresponds to the correlated messages and which has one or more workflow steps. The incident case can be output for review, execution, archiving, etc.

One embodiment provides a system for managing information related incidents. The system can include a processor, a user interface, and a machine readable medium carrying instructions which cause the processor to compare a number of disparate log messages to incident descriptions. The disparate log messages can be pre-parsed such that information encoded in the messages can be compared to the incident descriptions. When some messages correlate with an incident description, or more than one incident descriptions, the processor can create an incident case to correspond to the correlated messages and including one or more workflow steps. The processor can output the incident case. One embodiment provides a machine readable medium carrying such instructions.

Embodiments provide advantages over previously available approaches to managing information related incidents. Various embodiments provide one application for log message handling and for identifying, investigating, and handling potential incidents. Such embodiment eliminating needs for more than one application to do so and provide seamless integration of information regarding incidents. Embodiments reduce time, effort, and resources organizations use to identify incidents. Some embodiments require no, or little, human intervention to identify, investigate, and resolve incidents. Various embodiments integrate workflow into the log incident management environment. Some embodiments handle performance tracking information which is related to incidents in a manner similar to the way other types of data are handled, thereby reducing processing requirements and associated expenses and allowing all ready available information handling resources to be leveraged in handling information incident related information. Embodiments provide visibility into out-of-bounds incident handling.

Embodiments provide advantages related to regulatory compliance. Some embodiments reduce the time required to generate information for regulatory audits. Various embodiments provide pre-defined reports with more information than previous approaches provide. Some embodiments eliminate, if not reduce, staffing requirements associated with regulatory compliance issues. Time, effort, and resources involved in generating compliance reports can be reduced by embodiments These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the disclosure, and the disclosure includes all such substitutions, modifications, additions, or rearrangements.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Reference is now made in detail to the exemplary embodiments, examples of which are illustrated in the accompanying drawings. Wherever possible, the same reference numbers will be used throughout the drawings to refer to the same or like parts (elements).

Figure 1:
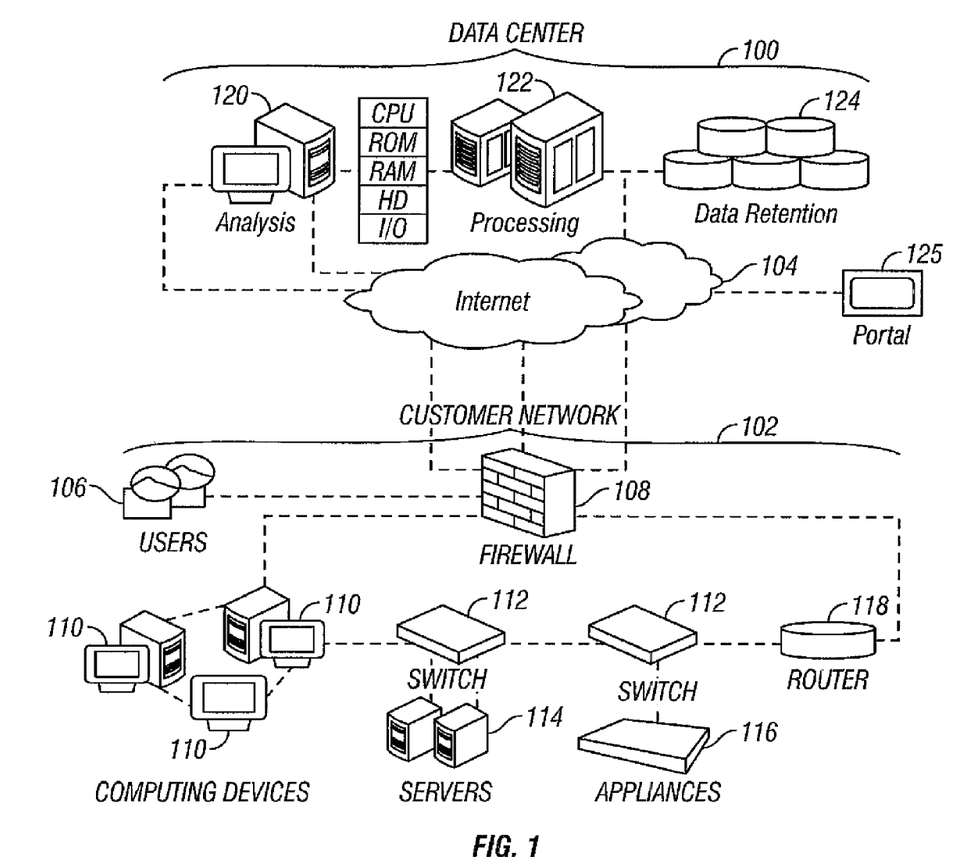
FIG. 1 depicts an architectural diagram of one embodiment of a system for log message processing using a remote internet infrastructure.

FIG. 1 illustrates one embodiment of a system for processing log messages 119. Within the system, components including, but not limited to, data center 100, network 102, network 104, users 106, firewall 108, computing devices 110, switches 112, servers 114, appliance 116, and router 118 can cooperate to process log messages 119 (see, e.g., FIG. 5). Systems and methods for processing log messages are described in U.S. patent application Ser. No. 12/141,202, entitled LOG MESSAGE ARCHIVING AND PROCESSING USING A REMOTE INTERNET INFRASTRUCTURE, filed on Jun. 18, 2008, by Church et al. which is incorporated herein as if set forth in full. As noted, the system includes appliance 116 and data center 100, each coupled to network 104. Other appliances 116 (not shown) may also be coupled to network 102 or network 104. Network 102 may be an intranet, a private network, a WAN, a LAN, etc. Network 104 may be a public network such as the Internet. Firewall 108 may control access to router 118 and computing devices 110. Appliance 116 may be located on network 102 behind firewall 108. Appliance 116 may communicate with devices such as firewall 108, servers 114, computing devices 110, routers 118, and switches 112 on network 102 to collect log messages 119 generated by users 106 or any of the devices. Computing devices 110 may include laptop computers, personal computers, personal digital assistants, cellular phones, etc.

Appliance 116 may be a desktop computer, a laptop computer, a workstation, or nearly any other device capable of receiving, processing, filtering, packetizing, compressing, encrypting, or sending log messages 119 over network 104 to data center 100. In some embodiments, appliance 116 may be an application residing at one or more of the devices located on network 102. Thus, appliance 116 may be an application running on server 114, may have a portion running on firewall 108 and another portion running on router 118, etc.

In one embodiment, appliance 116 can include a central processing unit ("CPU"), read-only memory ("ROM"), random access memory ("RAM"), a hard drive ("HD"), and input/output devices. Read only memory, random access memory, and hard drive memory of appliance 116 can include media that can be read by the central processing unit and other processors or machines. Therefore, each of these types of memories may include a computer-readable medium. These memories may be internal or external to appliance 116.

Data center 100 may include analysis devices 120, processing devices 122, and data retention devices 124 for receiving, processing, and archiving log messages 119. Analysis devices 120, processing devices 122, and data retention devices 124 can also have a CPU, ROM, RAM, and HD, either collectively or individually. Data center 100 may include portal 125 for access by users 106 via network 104 such that log messages 119 or data associated with the analysis of log messages 119 may be accessed. In some embodiments, web portal 125 may provide an interface for remote access. In some embodiments remote access may include configuring appliance 116, data retention devices 124, analysis devices 120, and/or processing devices 122. Remote access may include configuring criteria for determining what log messages 119 are stored, how many queues are created, the size of the packets, and the like.

Figure 2:
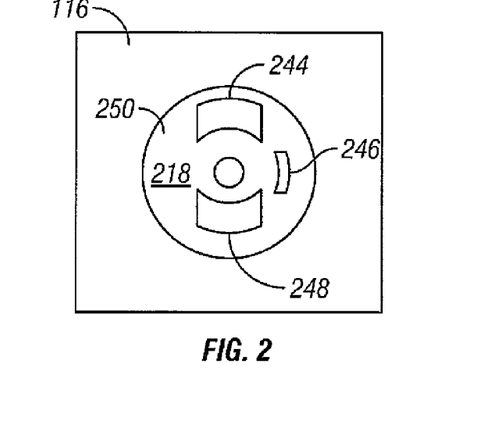
FIG. 2 depicts an illustration of one embodiment of a storage medium including software code having instructions in accordance with one embodiment.

FIG. 2 illustrates a combination of software code elements 244, 246, and 248 that may be embodied within computer-readable medium 218 on hard drive 250 in appliance 116. Alternatively, the instructions may be stored as software code elements on a DASD array, magnetic tape, floppy diskette, optical storage device, or other computer-readable medium or storage device. In an illustrative embodiment, the computer-readable instructions may be lines of compiled C++, Java, or other language code.

Various software components may reside on a single appliance 116. For example, in some embodiments, a filtering application, a packetizing application, an encryption application, a digital signing application, a memory cache, and log message 119 processing application may be stored in the same appliance 116. A set of computer-executable instructions in an embodiment may be contained on a data storage device, such as hard drive 250 of appliance 116.

During operation, embodiments disclosed herein include methods for providing log message 119 processing. In some embodiments, processing may include archiving, compliance processing, systems management, or other types of processing. Embodiments may offer log message 119 processing through a Software as a Service (SaaS) delivery platform. Appliance 116 may receive log messages 119 collected using the Syslog, MSRPC, or other protocols. Appliance 116 may filter the messages into transmission priority queues, packetize the messages based on the priority. Appliance 116 may securely transmit the packets to data center 100 for processing in accordance with customer desires, requirements, regulatory compliance, etc.

Figure 3:
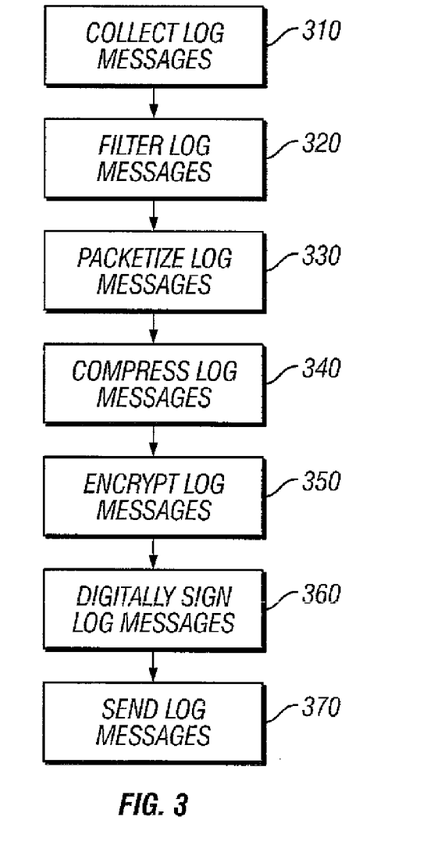
FIG. 3 depicts a flow chart of one embodiment of a method for remote archiving and processing of log messages.

FIG. 3 depicts a flow diagram for one method for processing log messages 119. In step 310, log messages 119 may be collected from computing devices on network 102 and stored in conjunction with appliance 116. In some embodiments, access to Microsoft Windows log messages 119 may be provided by remotely accessing the Windows Event Log using the Microsoft Remote Procedure Calf (MSRPC). In some embodiments, a customer may configure. firewall 108, servers 114, computing devices 110, routers 118 and switches 112 to send log messages 119 to appliance 116. Appliance 116 may store a set of computer-executable instructions operable to receive log messages 119 from computing devices 110, servers 114, switches 112, firewall 108, users 106, routers 118, or other devices located on network 102. Log messages may be sent according to the syslog protocol. RFC 3164 describes aspects of the syslog protocol. Those skilled in the art will appreciate that collection may be possible by changing the syslog pointers to appliance 116. Appliance 116 may store collected log messages 119 in a buffer, discussed below. In some embodiments, collecting log messages 119 may include translating log messages 119 using Dynamic Link Libraries (DLLs). U.S. patent application Ser. No. 12/141,209, filed on Jun. 18, 2008, and entitled "Log Message Collection Employing On-Demand Loading of Message Translation Libraries" describes one method for translating log messages 119 and is hereby incorporated by reference in its entirety.

In step 320, appliance 116 may utilize a set of message content rules to filter log messages 119 into priority queues or discard messages not designated for retention. In some embodiments, three priority queues may be used, although any number of priority queues may be established by user 106. The priority queues may be based on users 106, servers 114, computing devices 110, firewall 108, switches 112, or router 118. For example, log message 119 generated from a particular server 114 may have a higher priority than another server 114 may. A log message 119 generated by a selected user 106 may be designated a higher priority than log message 119 generated by another user 106. A log message 119 generated from outside firewall 108 may have a higher priority rating than log message 119 generated from inside firewall 108. The priority queues may be prioritized as high, medium, or low. The priority queues may have a numerical prioritization such as 1-5. Those skilled in the art will appreciate that other prioritization formats may be utilized. The filtered and prioritized log messages 119 may be stored in queues in appliance 116.

In step 330, appliance 116 may packetize the messages from one or more priority queues. Packetization may be based on the bandwidth of the network 104 available for communicating with data center 100 or the packetization algorithm. The bandwidth policy and packetization algorithm may independently affect the size of the packets, or may interact to affect the size of the packets.

A bandwidth transmission policy may be a set of limits specifying the bandwidth limit appliance 116 is permitted to utilize. The bandwidth limit may be specified as a number of bytes per second or some other criterion. In some embodiments, the set of limits may be composed of non-overlapping time frames, with each time frame having an associated bandwidth limit. In some embodiments, a default bandwidth may be in effect when no bandwidth limit has been specified. Thus, if the available bandwidth is high, the packet size may be larger to accommodate more log messages 119 or more packets may be sent. By packetizing the messages based on the available bandwidth, interference with day-to-day operations of the network or devices on the network may be reduced. In an example, Table 1 depicts a sample bandwidth transmission policy. In Table 1, a first (default) bandwidth limit is set at 1500 Kbps, a second bandwidth limit is set at 200 Kbps between 0600-1800 hours, and a third bandwidth limit is set at 700 Kbps between 1800-2100 hours.

TABLE 1

| Default Rate | 1500 Kbps |
| --- | --- |
| 0600-1800 hours | 200 Kbps |
| 1800-2100 hours | 700 Kbps |

With the effective bandwidth transmission limit in effect, appliance 116 may follow a packetization algorithm to generate packets of log messages 119 for transport. As log messages 119 arrive at appliance 116, they can be sorted into transmission priority queues based on a prioritization policy, such as in step 320. Appliance 116 may utilize a packetization algorithm to select log messages 119 from the various queues based on the priority of log message 119, and fill packets to the configured size limit.

Table 2 depicts one embodiment of a packetization algorithm that may be used by appliance 116 to packetize log messages 119.

TABLE 2

| 1. | Select log messages from the highest priority queue available until: | 1.1 | Size limit of packet is reached; |
| --- | --- | --- | --- |
| | | 1.2 | The queue is exhausted; or |
| | | 1.3 | The next log message is outside of the packet time interval. |
| 2. | Select log messages from the next lower queue available for the current interval, | 2.1 | The size limit of the packet is reached; |
| | | 2.2 | The queue is exhausted; or |
| | | 2.3 | The next log message is outside |

TABLE 2-continued

| | | | |
|---|---|---|---|
| | until: | | the packet time interval. |
| 3. | Repeat the second step until: | 3.1 | The size limit of the packet is reached; or |
| | | 3.2 | All queues have been processed. |

In one embodiment, when appliance 116 selects the highest priority queue, a queue may be skipped if the queue was exhausted, or may be skipped an each subsequent execution until the lowest priority queue is exhausted on the last execution of the algorithm, the queue is skipped for a priority-specific time period or the contents of the queue would fill more than half the contents of the size limits of packets.

Embodiments may also allow user 106 to designate rules for packetizing. For example, user 106 may establish criteria such that all high priority log messages 119 are packetized and sent from appliance 116 to data center 100 immediately, regardless of bandwidth. User 106 may establish criteria such that medium priority log messages 119 are sent only during selected hours, or when the bandwidth is at a selected level. User 106 may establish criteria such that low priority log messages 119 are sent only during selected hours, only when the bandwidth is at its highest level, or some other criteria. Thus, user 106 is able to designate criteria that enable embodiments to optimize the transmission of information to ensure higher priority messages are received timely, but without decreasing transmission rates (or increasing bandwidth costs) due to the transmission of lower priority messages. It will be apparent that a wide variety of criteria may be utilized by user 106 to designate these types of rules.

In step 340, appliance 116 may compress the packets. The compression of log message 119 data may be performed using the bzip2 algorithm [BZIP2]. In step 350, appliance 116 may encrypt each packet before sending the packet over network 104. The SHA-256 algorithm is one example of an encryption algorithm which may be used to encrypt such messages. In step 360, appliance 116 may digitally sign the encrypted packet before sending the packet over network 104. The FIPS 186-2 digital signature algorithm is one example of a digital signature algorithm which may be used to digitally sign such messages. Those skilled in the art will appreciate that other compression, encryption, and signature algorithms may be used.

Once constructed, in step 370 packets that have been compressed, encrypted, and digitally signed may be transmitted to data centers via encrypted transport over a public network, such as the Internet, and processed. In some embodiments, appliance 116 can communicate with data center 100 to send packets of log messages 119 from network 102 to data center 100 using network 104. Communications between appliance 116 and data center 100 can be accomplished using electronic, optical, radio-frequency, or other signals. For example, when user 106 accesses appliance 116, appliance 116 may convert the signals to a human understandable form when sending a communication to the user and may convert input from a human to appropriate electronic, optical, radio-frequency, or other signals to be used by data center 100. Similarly, when an operator accesses data center 100, data center devices 120, 122, and 124 may convert the signals to a human understandable form when sending a communication to the operator and may convert input from a human to appropriate electronic, optical, radio-frequency, or other signals to be used by appliance 116.

The transmission of packets may be controlled via appliance 116 in order to limit the amount of network bandwidth utilized, which allows the customer to manage the impact on their network.

Embodiments disclosed herein may satisfy regulatory compliance processing without the storage volume normally associated with archiving log messages 119. For example, if log messages 119 are retained in response to a statutory requirement, a digital signature may be used to verify that the compressed and encrypted log messages 119 archived in a remote infrastructure are the same as the original log messages 119. As a result, user 106 may satisfy the statutory requirement using a fraction of the storage volume.

Figure 4:
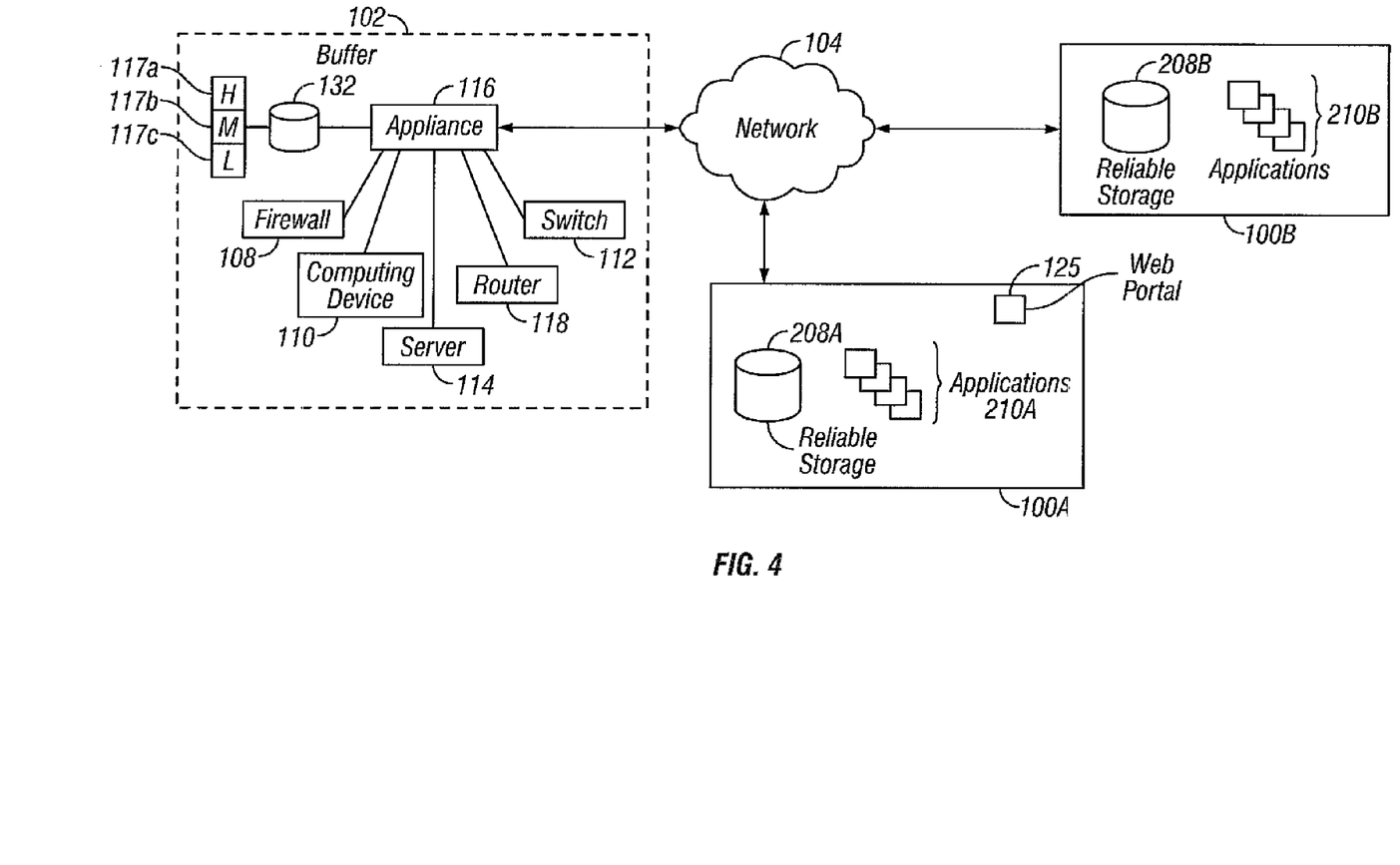
FIG. 4 depicts a block diagram of one embodiment of a system for log message processing using a remote internet infrastructure.

FIG. 4 depicts a block diagram of one embodiment of a system for archiving log messages. Appliance 116 on network 102 may communicate with computing devices 110, servers 114, switches 112 and routers 118, each of which may forward log messages to appliance 116. Appliance 116 may filter the log messages and prioritize the log messages received from computing devices 110, servers 114, switches 112, routers 118 and other devices located on network 102 based on user-defined criteria. Examples include, but are not limited to, the type of computing device, the identification (username or password) of a person 106 accessing or attempting to access network 102, the time of day, the program or application the user is using or attempting to use, the length of time the program is being used, and what information is being requested. In some embodiments, appliance 116 may store the filtered log messages in transmission priority queues such as queues 117a, 117b and 117c in buffer 132. Buffer 132 or queues 117a, 117b and 117c may be internal or external to appliance 116. In some embodiments, filtering may be based on a program, address or facility that generated the log message.

Appliance 116 may communicate with first data center 100A over network 104 to send packets from appliance 116 to first data center 100A. First data center 100A may receive packets which have been compressed, encrypted or digitally signed and store the packets in reliable storage 208A. First data center 100A may include applications 210A that are useful for analyzing log messages 119 in accordance with customer processing desires, requirements, protocols, etc. Applications 210A may be stored on analysis devices 120 or processing devices 122 (not shown in FIG. 4). First data center 100A may include applications 210A that may process log message 119 packets to decompress, decrypt, and verify packets and process the data contained in each packet. Examples of processing which may occur at first data center 100A include, but are not limited to, normalizing log messages 119, extracting data from log messages 119, full text indexing of log messages 119, parsing log messages 119, structured output, data persistence, correlating log message 119 data, and informing and alerting users of various events and processing results.

In some embodiments, full text indexing may be performed real time to enable users to access log messages 119. A drawback of prior art archiving is that there may be a delay of days or weeks before log messages 119 are available for searching. Embodiments disclosed herein allow nearly instantaneous search capability. In some cases, such as compliance processing, this enables a company, medical office, or other entity required to perform compliance processing to quickly access log messages 119. Advantageously, if there has been a breach of security, an unauthorized access, or some other event covered by HIPAA, GLB, SOX, or some other regulation, log messages 119 may be accessible almost instantly, which may be critical to preventing further events.

In some embodiments, parsing may be performed nearly real time. In some embodiments, parsing may be available nearly real-time for high-priority log messages 119, particularly when user 106 has designated that log messages 119 be sent immediately to another location.

In some embodiments, structured output processing may be performed on log messages 119. Structured output may be used to display information about log messages 119. For example, structured output processing may indicate when certain computing devices are most active, what programs and applications users 106 are accessing, and the like.

In some embodiments, persistence processing may be performed based on the type of information or regulations pertaining to the data. For example, legislation may require information to be retained for seven years. In this situation, the persistence processing may be more robust than persistence processing that may be based on a three-year requirement. Embodiments disclosed herein allow users to define criteria for archiving and processing, such that each customer may designate the storage requirements they need, etc. In this way, user 106 that requires less robust storage requirements may not need to pay for a robust storage system, but may easily change the storage requirements if needed.

In some embodiments, advanced correlation processing may also be performed. For example, appliance 116 may send log messages 119 indicating that the same user 106 has tried to access server 114 from several different computing devices 110 at the same time. Each attempt, when viewed as a stand-alone event, may not be noteworthy. However, advanced correlation processing may determine that the password for user 106 has been compromised and that multiple users 106 attempting to use the same password should be blocked. In some embodiments, advanced correlation processing may be useful for determining when firewall 108 has been breached, when servers 114 are being attacked, or the like.

Alerting may refer to sending a communication based on log message 119. First data center 100A may process log messages 119 in a packet such that information is available for users 106.

Data center 100A having applications 210A for processing may provide many advantages. As an example, if an unauthorized user 106 accessed a patient file stored on server 114, log message 119 may be generated to indicate that an unauthorized user 106 was accessing the database, log message 119 may be generated to indicate that user 106 had logged on to a particular computing device 110, log message 119 may be generated to indicate that user 106 had accessed server 114, etc. Each log message 119 generated from the event may be filtered as a high priority message and sent immediately to data center 100A. Applications 210A in data center 100A may process log messages 119 to determine the response. In some embodiments, data center 100A may send an alert to user 106 in network 102 notifying user 106 that they are not authorized to access the database, send an alert to the supervisor of user 106, send an alert to the computing device 110 upon which unauthorized user 106 is accessing the database, send an alert to server 114, etc. The alert may inform user 106 to stop accessing the database, a set of instructions for computing device 110 to logoff the unauthorized user, a set of instructions to deny further access to server 114, etc.

First data center 100A may send a copy of each compressed, encrypted, and digitally signed packet to second data center 100B. Thus, second data center 100B may receive a copy of the packet of log messages 119 that has been packetized, compressed, encrypted or digitally signed and sent to first data center 100A. Second data center 100B may include storage 208B and applications 210B. Applications 210B may perform the same or different processing on packets in second data center 100B that applications 210A perform on packets received in first data center 100A. For example, in some embodiments, data center 100B does not perform alert processing. In some embodiments, data center 100B may perform some alert processing but may not send an alert. In some embodiments, by having redundant or similar functionality, data center 1008 may assume the functions of data center 100A in the event data center 100A is unable to function as the primary data center, such as due to a natural disaster or other outside factor, or due to being taken off-line for maintenance or some other internal factor. In some embodiments, data center 100A may be the primary data center for a first network and the secondary (backup) data center 100B for a second network, and data center 100B may be the primary data center for second network and the secondary (backup) data center for first network.

After data center 100B has received a copy of the packet sent from data center 100A, data center 100E may send an acknowledgement message to data center 100A. Upon receipt of the acknowledgment message, data center 100A may forward the message or may send a copy of the message to appliance 116. If first data center 100A does not receive an acknowledgement within a selected time limit, first data center 100A may send another copy of the packet. Upon receipt of an acknowledgement message from data center 100A, appliance 116 may delete the corresponding packet from memory. If appliance 116 does not receive an acknowledgement within a selected time limit, appliance 116 may send another copy of the packet. An advantage is that the storage volume needed for storage of information on network 102 may be minimized based on criteria set up by the customer, and may ensure log messages 119 are securely stored at a remote Internet infrastructure before deleting log messages 119 off network 102.

Log messages 119 can indicate that some underlying event associated with one or more of network 102, network 104, users 106, firewall 108, computing devices 110, switches 112, servers 114, appliance 116, router 118, the programs running thereon, etc. may have occurred. For example, one of the foregoing devices 102, 104, 108, 110, 112, 114, 116, etc. 118 may have failed, malfunctioned, began some activity, terminated some activity, powered up, booted, etc. Various programs may have begun executing, terminated, etc. Users 106 may have logged in, logged off, accessed some resource, created, deleted, or modified files, etc. Other parties may have attempted to access network 102, actually accessed network 102, accessed some resource, created, deleted, or modified files, hacked some resource, etc. Some of these events represent normal operation of network 102, some represent abnormal operation of network 102, some represent potentially negligent or malicious activity within or on network 102. Accordingly certain users such as IT personnel, managers, and owners of network 102 may be interested in what events have or may be occurring on network 102. Certain regulations and practices may make it desirable to detect, remediate, report, these, and other, events. Log messages 119 provide one source of data regarding such events and potential events. By examining log messages 119 users 106 can detect, remediate, and report such events.

Figure 5:
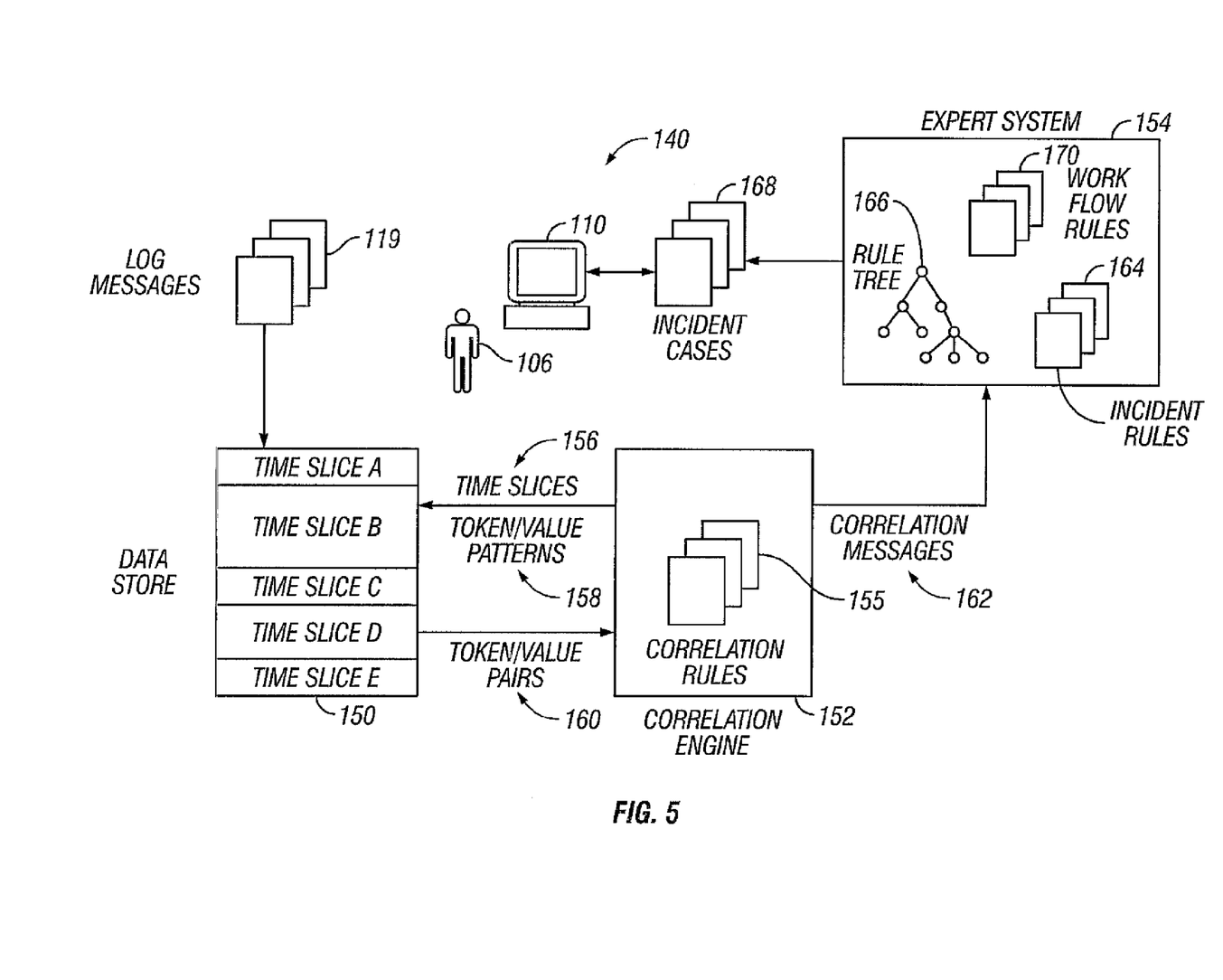
FIG. 5 is a block diagram illustrating one embodiment of an incident processing system.

With reference now to FIG. 5, FIG. 5 illustrates system 140 of various embodiments. System 140 can reside in whole, or in part, in data center 100 (of FIG. 1) System 140 can include data store 150, correlation engine 152, and expert system 154. Data store 150 can store log messages 119. Correlation engine 152 can include correlation rules 155 from which correlation engine 152 can determine time slices 156 and token/value patterns 158. Using time slices 156, correlation engine 152 can examine log messages 119 in data store 150 to determine which log messages 119 correlate with each other.

Correlation engine 152 can extract token/value pairs 160 from correlated log messages 119 for further processing. Correlation engine 152 can create correlation messages 162 based on correlation rules 155 and extracted token/value pairs 160.

Expert system 154 of FIG. 5 can include incident rules 164 from which it can build rule tree 166. Using rule tree 166, expert system 154 can examine correlation messages 162 to determine whether it might be desirable to create incident cases 168. Incident cases 168 can be files, documents, etc. describing one or more potential incidents, the particular correlated log messages 119 which gave rise to incident cases 168, work flow steps to take to remediate the potential incident, etc. Incident cases 168 indicate that it may be desirable for one or more users 106 to respond to the potential incidents underlying incident cases 168. Correlation rules 155 can be relational meta-messages related to various potential incidents via pre-defined correlation rules 155. Expert system 154 can include workflow steps based on workflow rules 170 which expert system 154 can include. Users 106 can access incident cases 168 via computing devices 110 (of FIG. 1) and can view, handle, and (in some cases) modify incident cases 168.

Figure 6:
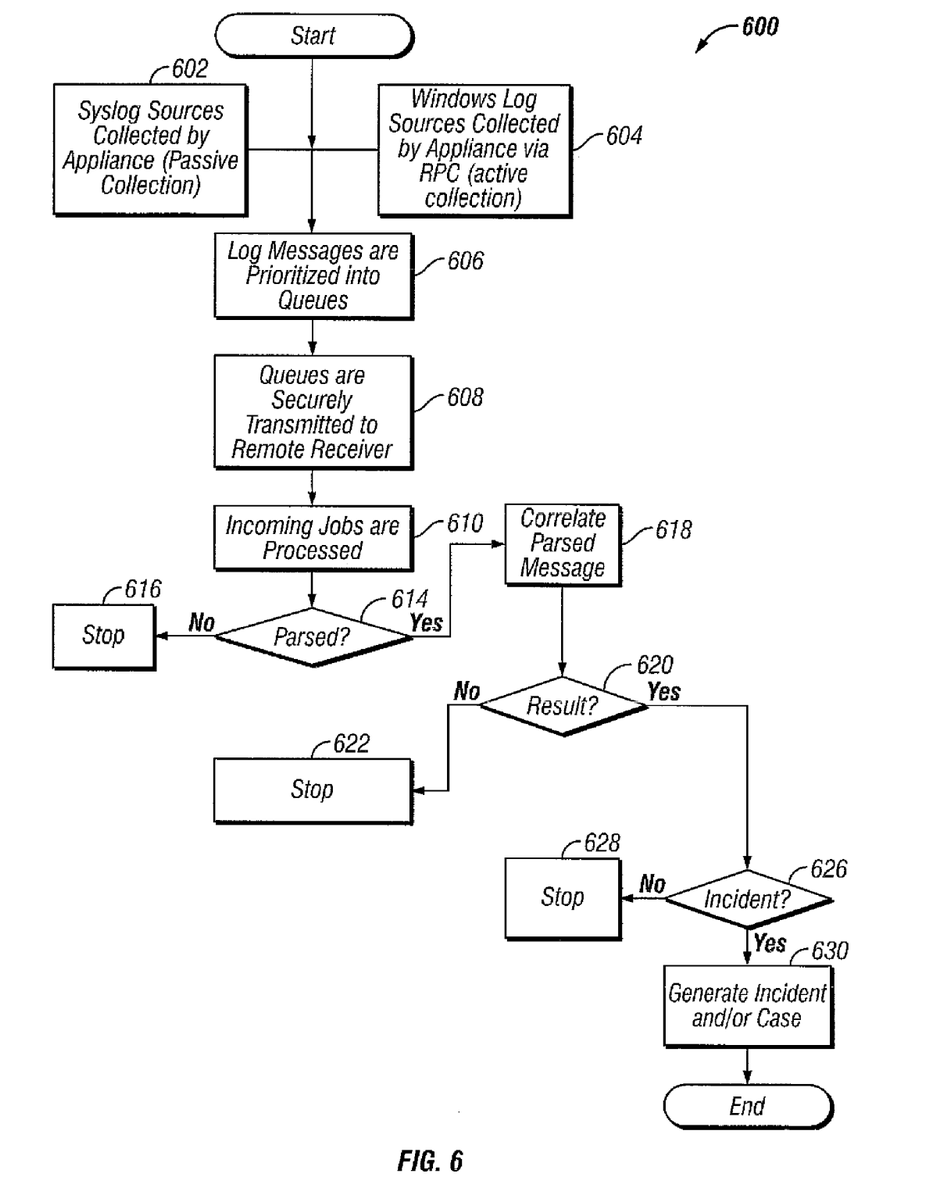
FIG. 6 illustrates a flowchart of a method implemented by one embodiment.

With reference now to FIG. 6, one embodiment implementing method 600 for correlating log messages 119 with incident descriptions and creating associated incident cases 168 is illustrated. At steps 602 and 604, appliance 116 of FIG. 1 can collect potentially numerous, disparate, free form, log messages 119 from various sources. In some scenarios illustrated by step 602, appliance 116 collects log messages 119 from sources using the Syslog protocol. Some log message 119 collecting protocols such as Syslog can be passive. In some scenarios, appliance 116 collects log messages 119 from Windows log message 119 sources via active protocols such as a remote procedure call (RPC) protocol. Log message gathering protocols, techniques, methods, etc. other than Syslog and RPC are known to those skilled in the art and can be used to collect log messages 119 without departing from the scope of the disclosure.

Log messages 119 collected at steps 602 and 604 can be prioritized into queues for selective transmission to data center 100 for archiving, parsing, processing, etc. Log messages 119 can be encrypted to maintain security if desired. At step 610, log messages 119 can be decrypted and parsed to extract token/value pairs (and the information which they convey) from them related to various potential incidents which may, or may not, be affecting customer network 102. U.S. patent application Ser. No. 12/163,733, filed on Jun. 27, 2008, by Lavrik et al., and entitled SYSTEMS AND METHODS FOR AUTOMATED LOG EVENT NORMALIZATION USING THREE-STAGED REGULAR EXPRESSIONS describes systems and methods for parsing log messages 119 and extracting information there from. Tokens can denote fields with predefined meanings within particular log messages 119. Tokens can have an associated hierarchy which can allow tokens to be grouped into families such as "source address," destination address," etc. of the family "addresses." At step 614, it can be determined whether various log messages 119 were parsed. When any particular log message 119 can not be parsed, that log message 119 can be archived. Processing associated with the un-parsed log message 119 can be terminated at step 616. For log messages 119 which parsed successfully, processing can continue at step 620.

At step 620, parsed log messages 119 can be correlated with other log messages 119 to determine whether some indications of an incident might be derived from various log messages 119. Such indications include, but are not limited to, the frequency of certain log messages 119, the severity of events underlying various log messages 119, the apparent source of the underlying event, the affected portion of customer network 102, the originator of log message 119, etc. Correlation of various log messages 119 using such indicators is discussed further with reference to FIG. 7. If a particular log message 119 does not appear to correlate with other log messages 119, further processing of that particular log message 119 may terminate at step 622. That particular log message 119, though, can be archived and statistics related to various correlation indicators can be gathered for that log message 119 and stored for correlation with other log messages 119.

For log messages 119 which appear to correlate with other log messages 119, it can be determined whether an incident should be triggered at step 626. Determining whether an incident should be triggered can be rule based (making such determinations extensible) and is discussed further with reference to FIG. 8. When it is determined not to trigger an incident, processing can be terminated at step 628. Statistics related to various correlation indicators can be gathered and stored for correlating other log messages 119. When it is determined that it might be desirable to trigger an incident, incident case 168 can be generated at step 630 (as discussed further with reference to FIG. 9). As discussed herein, incident cases 168 can allow tracking of activity related to various incidents.

Figure 7:
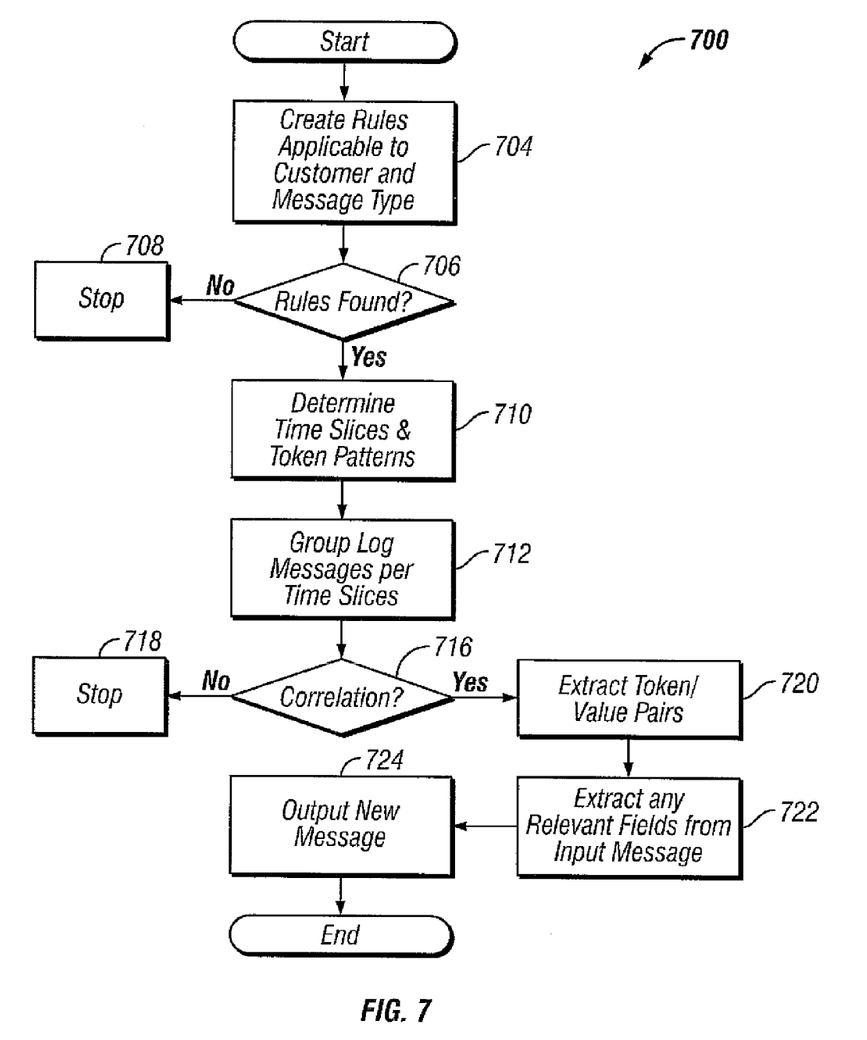
FIG. 7 illustrates a flowchart of a method implemented by one embodiment.

With reference now to FIG. 7, FIG. 7 illustrates method 700 implemented by some embodiments for correlating log messages 119 with each other. At step 704, extracted token/value pairs 160 can be examined to determine various attributes of correlated log messages 119. Based on those attributes, correlation rules 155 applicable to the particular customer and log message 119 type can be created, loaded, retrieved, etc. at step 704.

Many types of incidents are known to create a signature of log messages 119 as the incidents unfold. Correlation rules 155 can reflect these log message 119 signatures of known or suspected types of incidents. Correlation rules 155 can therefore correlate messages with other log messages 119 by various attributes of log messages 119 associated with various incident signatures. Such attributes can include the particular appliance(s) 116 involved, the types of log messages 119, the category of those log messages 119, the computer applications which generated log messages 119, the source hosts from which log messages 119 came, the severity levels associated with log messages 119, the facilities associated with log message 119 (such as a particular building at a geographic location), etc. Some correlation rules 155 can include token values against which extracted token/value pairs 160 from log messages 119 can be compared to determine whether the particular correlation rule 155 is applicable to the particular log message 119. In some scenarios, token values for various correlation rules 155 can be "admin," "user2," not "some_host," etc. Various correlation rules 155 can be used to determine whether some number of log messages 119 correlate within some user selected time slice 156 (in one scenario, a particular correlation rule 155 requires five log messages 119 to correlate with each other within 30 minutes to indicate that the particular log messages 119 correlate). Various correlation rules 155 can cause correlation messages 162 to be created when log messages 119 correlate. Correlation messages 162 can be named after correlation rules 155 which create them and can have content sections defined by those correlation rules 155. The content sections can include extracted token/value pairs 160 and, if desired, information describing the meaning of the event(s) underlying correlated messages 119.

At step 710, various correlation rules 155 can be examined to determine applicable time slices 156 and patterns of token/value pairs which may be indicative of potential incidents. At step 712, various log messages 119 in data store 150 can be grouped according to time slices 156. Time slices 156 can be examined at step 716 to determine whether they match applicable token/value patterns 158. At step 716, if some time slices 156 have no log messages 119 which correlate, processing can be terminated for those particular time slices 150 at step 718. For time slices 156 which do have correlated log messages 119, token/value pairs 160 of correlated log messages 119 can be extracted at step 722. At step 724, extracted token/value pairs 160 can be placed in correlation message 162 for further processing.

Figure 8:
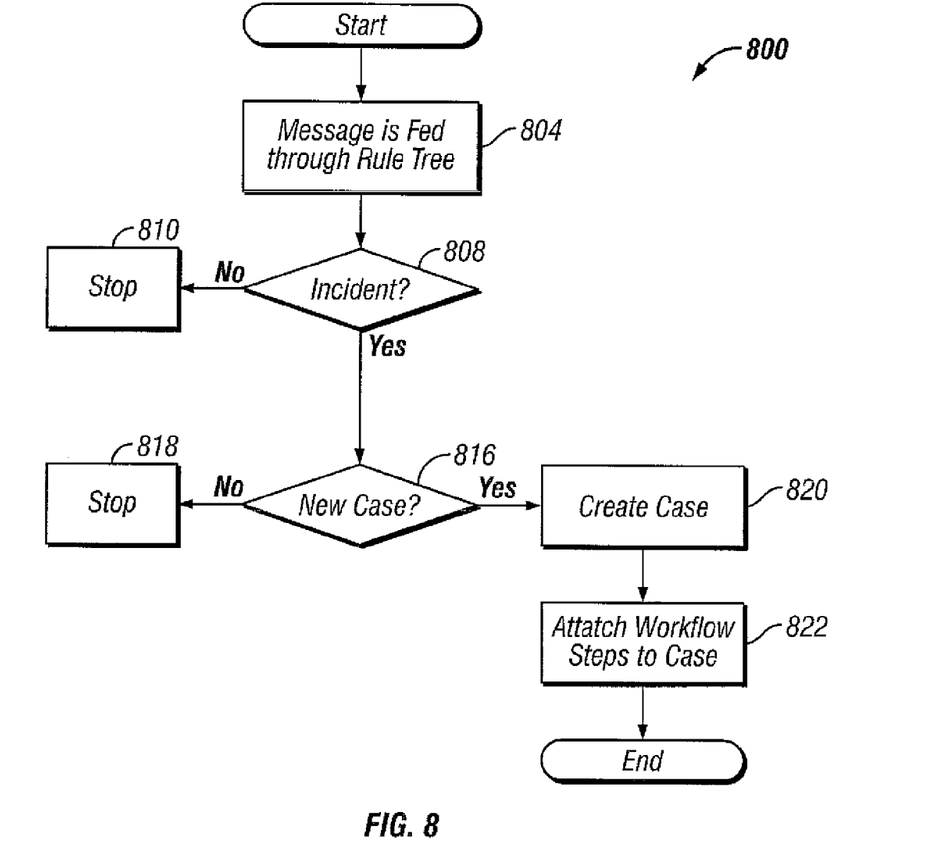
FIG. 8 illustrates a flowchart of a method implemented by one embodiment.

FIG. 8 illustrates method 800 implemented by some embodiments for determining whether an incident might have occurred by processing log messages 119. At step 804 of method 800, correlation messages 162 can be fed through rule tree 166 (of FIG. 5) to determine whether an incident might have occurred. Rule tree 166 can reflect incident rules 164, thereby enabling rule tree 166 to determine whether correlation messages 162 indicate that an incident might have occurred. When incident rules 164 indicate that an incident has not occurred, processing of correlation messages 162 can terminate as shown at steps 808 and 810. When any incident rule 164 indicates that an incident has occurred, processing of various correlation messages 162 may continue at step 816.

At step 816, correlation message 162 associated with the underlying potential incident can be compared to incident rules 164 to determine whether correlation message 162 might relate to an existing incident case 168 or whether it might be desirable to create a new incident case 168. It can therefore be incident rules 164 which determine whether or not to build incident case 168. At step 816, when it is determined that correlation message 162 might relate to an existing incident case 168, correlation messages 162 (and, as will be discussed, workflow steps associated therewith) can be used to modify the particular incident case 168 to which it might relate. At step 816, when it is determined that it is desirable to create incident case 168, processing of correlation messages 162 can continue at step 820.

At step 820, incident case 168 can be created. Incident cases 168 can be named after the particular correlation messages 162 which triggered their creation and can contain information describing the events underlying incident cases 168. Incident case 168 can include information regarding whether the underlying incident might be associated with various compliance regulations, vulnerabilities associated with customer network 102 (of FIG. 1), possible explanations of the cause of the underlying incident, predictions of potential future activities that might relate to the underlying incident, etc. Additional correlation messages 162 which might relate to the underlying incident can also modify incident case 168. Some users 106 can modify the event description in incident case 168. Incident cases 168 can specify that a particular user 106 can be responsible for handling the underlying potential incident via incident cases 168.

In one embodiment, incident case 168 can take the form:
INCIDENT CASE: HOST LOCK UP NO. 1234
Add Step (AS): Reboot Host % h
AS: Call handling number % n
Severity: 3
Time to Handle: 30 minutes
* * *

Where % h can be the name of the affected host and % n can be the telephone number of an incident handling center.

Workflow steps can be associated with incident case 168 at step 822 via workflow rules 170. Some workflow rules 170 can correspond to various scenarios envisioned in certain compliance regulations such as the Payment Card Industry Data Security Standard (PCI DSS), Sarbanes-Oxley Act (SOX), Health Insurance Portability and Accountability Act (HIPAA), and the Gramm-Leach-Bliley Act (GLBA). In which case, workflow rules 170 can associate pre-defined workflow steps associated with the particular compliance regulation to applicable incident cases 168. Some workflow rules 170 can correspond to user 106 generated incident scenarios. In which case, workflow rules 170 can associate user created workflow steps with applicable incident cases 168.

In one embodiment, a particular workflow rule 170 can be "inspect host x for further activity of type y" where 'x' is the particular host which triggered a particular correlation message 162 matched by this particular workflow rule 170 and where 'y' is a remedial activity of a type associated with the particular correlation rule 155 for the correlation message 162. In another scenario, a particular workflow rule 170 can be "contact user z and inquire as to the status of their account" where 'z' is a username extracted from log message 119 matched by a particular correlation rule 155 which triggered a particular incident case 168.

Figure 9:
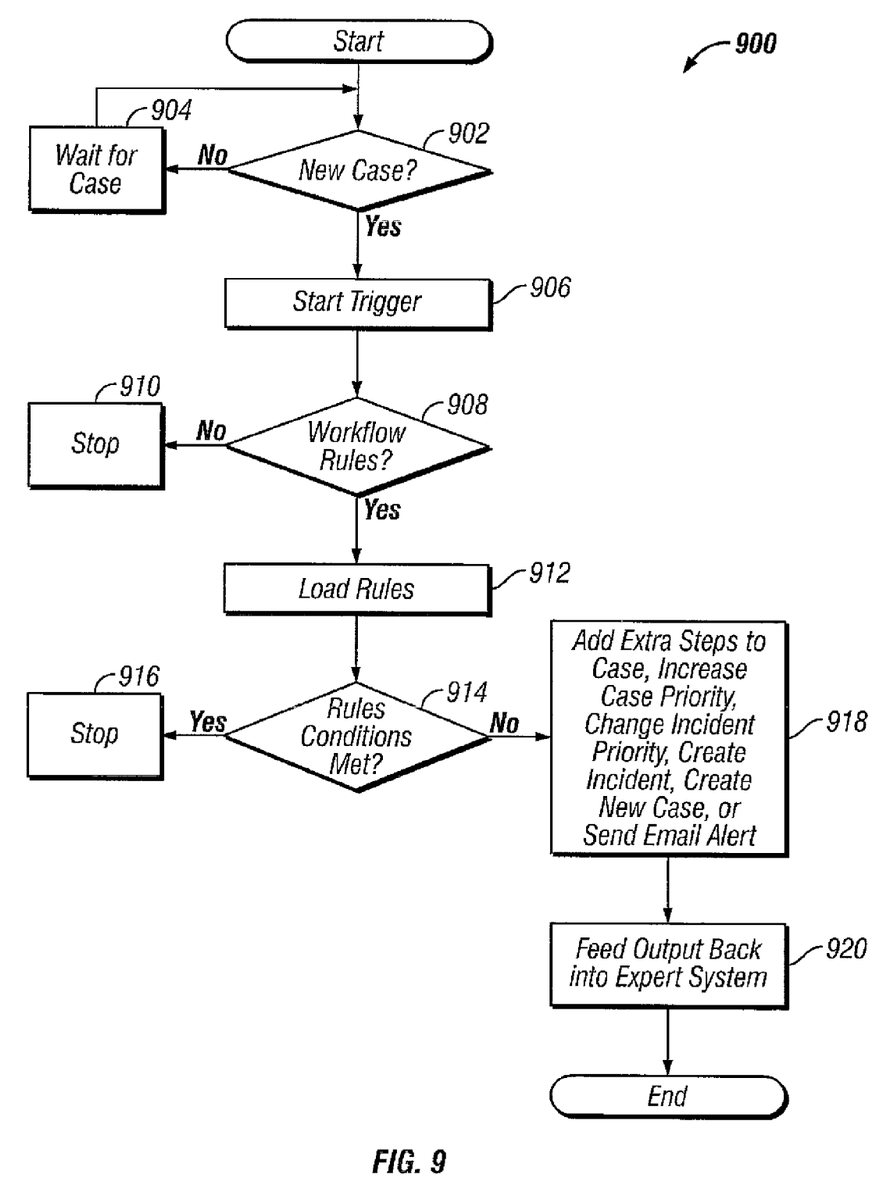
FIG. 9 illustrates a flowchart of a method implemented by one embodiment.

FIG. 9 illustrates method 900 implemented by some embodiments for tracking progress of incident cases 168. At step 902, it can be determined whether any incident cases 168 remain open. When no open incident cases 168 remain open, method 900 can await the creation of another incident case 168. When any incident case 168 remains open, method 900 can continue at step 906. At step 906, a timer may be started for incident cases 168 which may not have had a timer started yet. At step 908, it can be determined whether any user selected workflow rules 170 exist for incidents of the type under consideration. When no user selected workflow rules 170 exist for the particular incident case 168 under consideration, processing of that incident case 168 can terminate as shown at step 910. When workflow rules 170 exist for the particular incident case 168 under consideration, processing of that incident case 168 can continue at step 912. When workflow rules 170 do exist for incident case 168, workflow rules 170 can be loaded for incident case 168 at step 912. At step 914, it can be determined whether the conditions expressed by workflow rules 170 have been met in incident case 168. When those conditions have been met, processing of incident case 168 can be terminated and incident case 168 can be archived at step 916.

When conditions of workflow rules 170 associated with incident case 168 have not been met, method 900 may continue at step 918. In some cases, at step 918, additional workflow rules 170 (and therefore workflow steps) can be added to incident case 168, the priority of incident case 168 can be modified, another incident or another incident case 168 can be created (to, in some scenarios, investigate why the workflow conditions have not been met), an alert my be sent to selected users 106, etc. At step 920, results of methods 700, 800, and 900 can be examined and used to modify correlation rules 155, incident rules 164, workflow rules 170, etc.

Figure 10:
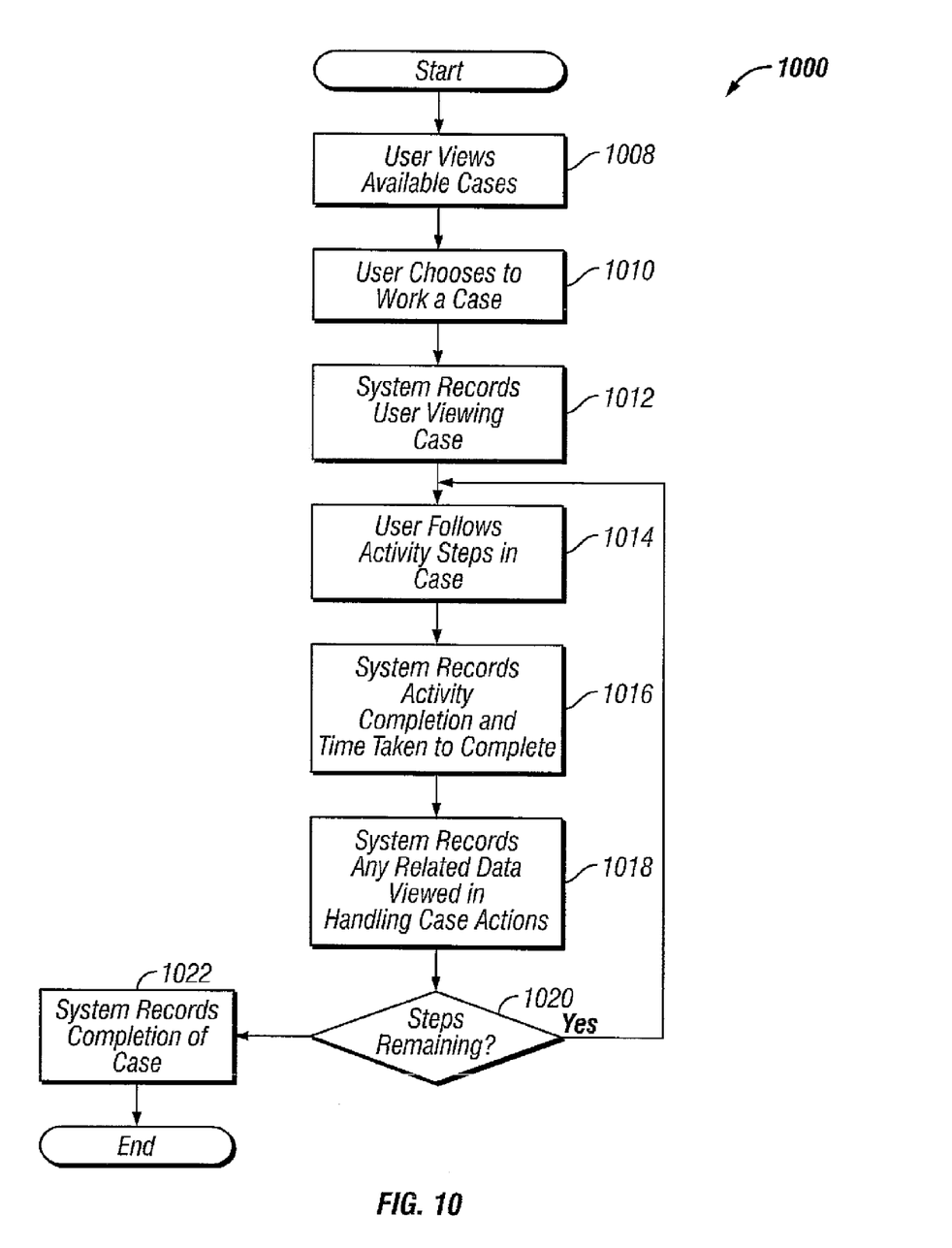
FIG. 10 illustrates a flowchart of a method implemented by one embodiment.

With reference now to FIG. 10, FIG. 10 illustrates method 1000 for handling incident cases 168 implemented by some embodiments. At step 1008, users 106 can view available incident cases 168 and select incident case(s) 168 on which to work at step 1010. It can be recorded that users 106 selected certain incident cases 168 and the time at which users 106 selected those incident cases 168 at step 1012. At step 1014, users 106 can follow various workflow steps associated with the selected incident cases 168. Such user 106 activities and the times at which they occurred can be recorded at step 1016. When it is determined that a particular workflow step is late in being completed or took longer than expected, alerts can be sent to the particular user 106 and others regarding the situation. In some scenarios, users 106 can view information potentially pertinent to selected incident cases 168 as part of their efforts to handle those incident cases 168. When users 106 do so, it can be recorded that users 106 viewed such information at step 1018. At step 1020, it can be determined whether any workflow steps remain to be finished by various users 106. If workflow steps remain, method 1000 can return to step 1014 at which users 106 can continue performing those workflow steps. If all workflow steps have been completed, it can be recorded that handling of particular incident cases 168 has been completed and the time at which the last workflow step was completed. Thus, incident cases 168 can track the handling of incidents, users who participated, and how long various workflow steps took. Reports can be generated regarding overall incident case 168 handling and various aspects of workflow steps therein. Such reports can be used to report on in and out of bounds incident handling for incidents associated with compliance regulations.

Figure 11:
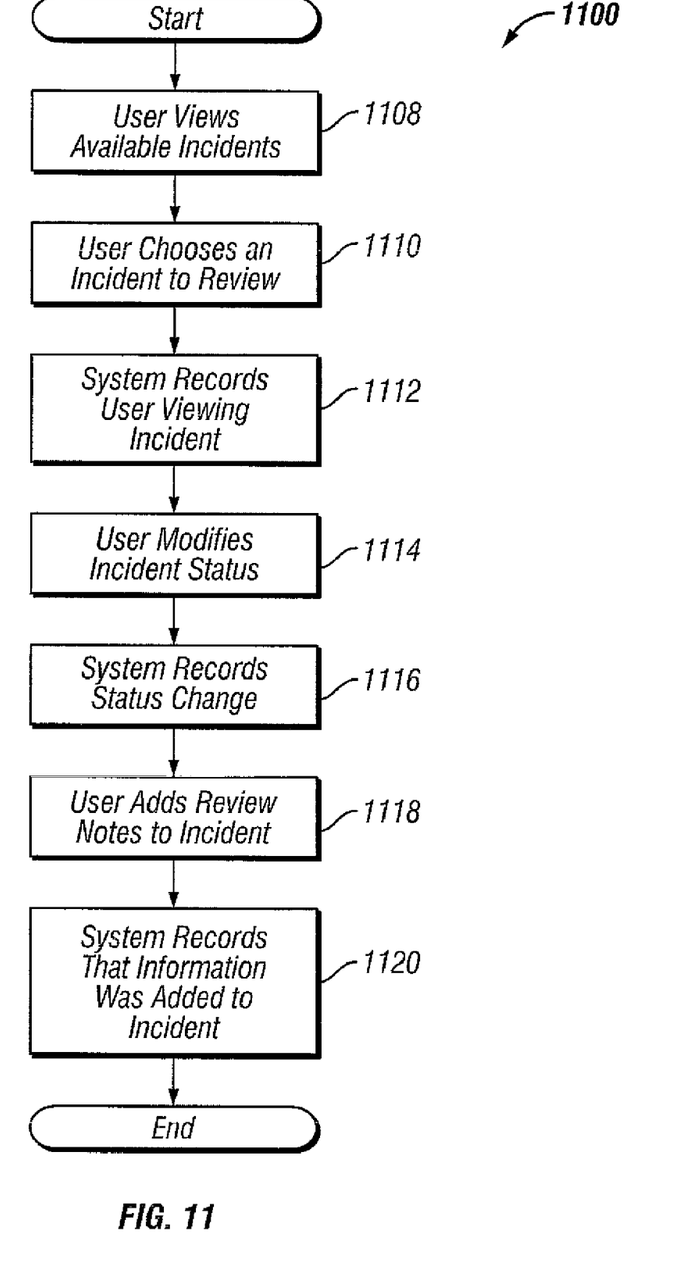
FIG. 11 illustrates a flowchart of a method implemented by one embodiment.

With reference now to FIG. 11, method 1100 implemented by some embodiments for tracking incident case 168 handling is illustrated. At step 1108, users 106 can view reports containing information regarding existing (and prior) incident cases 168. Users 106 can choose incident cases 168 for further consideration at step 1110. At step 1112, it can be recorded that users 106 have accessed various incident cases 168. Users 106, at step 1114, can modify selected incident cases 168, their status, priority, completion due date, etc. It can be recorded at step 1116 that the particular user 106 modified a particular incident case 168. Users can add review notes to incident cases at step 1118 and that occurrence can be recorded at step 1120.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below and their legal equivalents.

What is claimed is:

1. A method of managing incidents comprising:
at a computer having at least one processor, comparing a plurality of parsed log messages to one another, wherein the plurality of parsed log messages are free form log messages, wherein parsing occurs substantially in real time;
if two or more of the plurality of parsed log messages correlate, generating one or more correlation messages and comparing the one or more correlation messages to a plurality of incident descriptions;
determining from the one or more correlation messages whether to create an incident case corresponding to the one or more correlation messages;
associating one or more workflow steps with the incident case; and
outputting the incident case with the workflow steps.

2. The method of claim 1 further comprising:
comparing additional log messages to the incident descriptions; and
when the additional log messages correlate with an incident description associated with the incident case, adjusting the incident case.

3. The method of claim 2 wherein the adjusting the incident case includes associating additional workflow steps with the incident case.

4. The method of claim 1 further comprising monitoring a result of the workflow steps.

5. The method of claim 4 further comprising adjusting the workflow steps based on the result of the workflow steps.

6. The method of claim 4 wherein the result includes out-of-bounds activities.

7. A non-transitory machine readable medium carrying instructions for managing incidents which when executed by a machine cause the machine to:
compare a plurality of parsed log messages to one another, wherein the plurality of parsed log messages are free form log messages, wherein parsing occurs substantially in real time;
if two or more of the plurality of parsed log messages correlate, generate one or more correlation messages and compare the one or more correlation messages to a plurality of incident descriptions;
determining from the one or more correlation messages whether to create an incident case corresponding to the one or more correlation messages;
associate one or more workflow steps with the incident case; and
output the incident case with the workflow steps.

8. The machine readable medium of claim 7 wherein the instructions further cause the machine to:
compare additional log messages to the incident descriptions; and
when the additional log messages correlate with an incident description associated with the incident case, adjust the incident case.

9. The machine readable medium of claim 8 wherein the instructions which cause the machine to adjust the incident case includes instructions which cause the machine to associate additional workflow steps with the incident case.

10. The machine readable medium of claim 7 wherein the instructions further cause the machine to monitor a result of the workflow steps.

11. The machine readable medium of claim 10 wherein the instructions further cause the machine to adjust the workflow steps based on the result of the workflow steps.

12. The machine readable medium of claim 7 wherein the result includes out-of-bounds activities.

13. A system for managing incidents comprising:
a processor;
an interface in communication with the processor; and
a machine readable medium in communication with the processor and carrying instructions which when executed by the processor cause the processor to:
compare a plurality of parsed log messages to one another, wherein the plurality of parsed log messages are free form log messages, wherein parsing occurs substantially in real time;
if two or more of the plurality of parsed log messages correlate, generate one or more correlation messages and compare the one or more correlation messages to a plurality of incident descriptions;
determine from the one or more correlation messages whether to create an incident case corresponding to the one or more correlation messages;

associate one or more workflow steps with the incident case; and output the incident case with the workflow steps via the interface.

14. The system of claim 13 wherein the instructions further cause the machine to:

compare additional log messages to the incident descriptions; and when the additional log messages correlate with an incident description associated with the incident case, adjust the incident case.

15. The system of claim 14 wherein the instructions which cause the machine to adjust the incident case includes instructions which cause the machine to associate additional workflow steps with the incident case.

16. The system of claim 13 wherein the instructions further cause the machine to monitor a result of the workflow steps.

17. The system of claim 16 wherein the instructions further cause the machine to adjust the workflow steps based on the result of the workflow steps.

* * * * *